(12) United States Patent
Ruckstuhl

(10) Patent No.: US 6,901,846 B2
(45) Date of Patent: Jun. 7, 2005

(54) COFFEE MACHINE

(75) Inventor: Stephan Ruckstuhl, Neuendorf (CH)

(73) Assignee: ETNA Vending Technologies b.v., AW Ulft (NL)

( * ) Notice: Subject to any disclaimer, the term of this patent is extended or adjusted under 35 U.S.C. 154(b) by 0 days.

(21) Appl. No.: 10/471,002

(22) PCT Filed: Mar. 4, 2002

(86) PCT No.: PCT/CH02/00130

§ 371 (c)(1),
(2), (4) Date: Feb. 18, 2004

(87) PCT Pub. No.: WO02/069769

PCT Pub. Date: Sep. 12, 2002

(65) Prior Publication Data

US 2004/0118296 A1 Jun. 24, 2004

(30) Foreign Application Priority Data

Mar. 7, 2001 (CH) ................................. 425/01

(51) Int. Cl.⁷ ................................. A47J 31/40
(52) U.S. Cl. .................. 99/287; 99/289 R; 99/295
(58) Field of Search .............. 99/516, 483, 279–287 R, 99/293, 302 R, 295, 297–307, 452–455, 323.3

(56) References Cited

U.S. PATENT DOCUMENTS

| 4,796,521 A | * | 1/1989 | Grossi | 99/287 |
| 4,885,986 A | * | 12/1989 | Grossi | 99/289 R |
| 4,934,258 A | * | 6/1990 | Versini | 99/289 R |
| 5,094,156 A | * | 3/1992 | Noreille et al. | 99/516 |
| 5,230,277 A | * | 7/1993 | Bianco | 99/287 |
| 5,275,089 A | * | 1/1994 | Armellin | 99/289 R |
| 5,302,407 A | * | 4/1994 | Vetterli | 426/433 |
| 5,387,256 A | * | 2/1995 | Enomoto | 99/286 |
| 5,479,848 A | | 1/1996 | Versini | |

FOREIGN PATENT DOCUMENTS

| CH | 682798 | 11/1993 |
| EP | 0 202 517 | 11/1986 |
| EP | 0 486 434 | 5/1992 |
| EP | 0 486 435 | 5/1992 |

* cited by examiner

Primary Examiner—Timothy F. Simone
(74) Attorney, Agent, or Firm—Young & Thompson

(57) ABSTRACT

A coffee machine (10) comprises a removable brewing unit (18), in which ground coffee powder is compacted in a brewing chamber along a main axis of the brewing unit (18) between a movable lifting bottom and a plunger that can be displaced toward the lifting bottom. Pressurized hot water is pressed through the compacted coffee powder. Afterwards, the lifting bottom and plunger are displaced together along the main axis in order to push the remaining filter cake out of the brewing chamber whereby ejecting it transversal to the main axis. The aim of the invention is to provide a coffee machine of the aforementioned type with a simplified and space-saving design as well as with an easier accessibility for cleaning and maintenance purposes. To these ends, the brewing unit (18) is designed so that it can be pushed into the coffee machine (10) from the front towards the back with the main axis parallel to the direction of insertion.

12 Claims, 5 Drawing Sheets

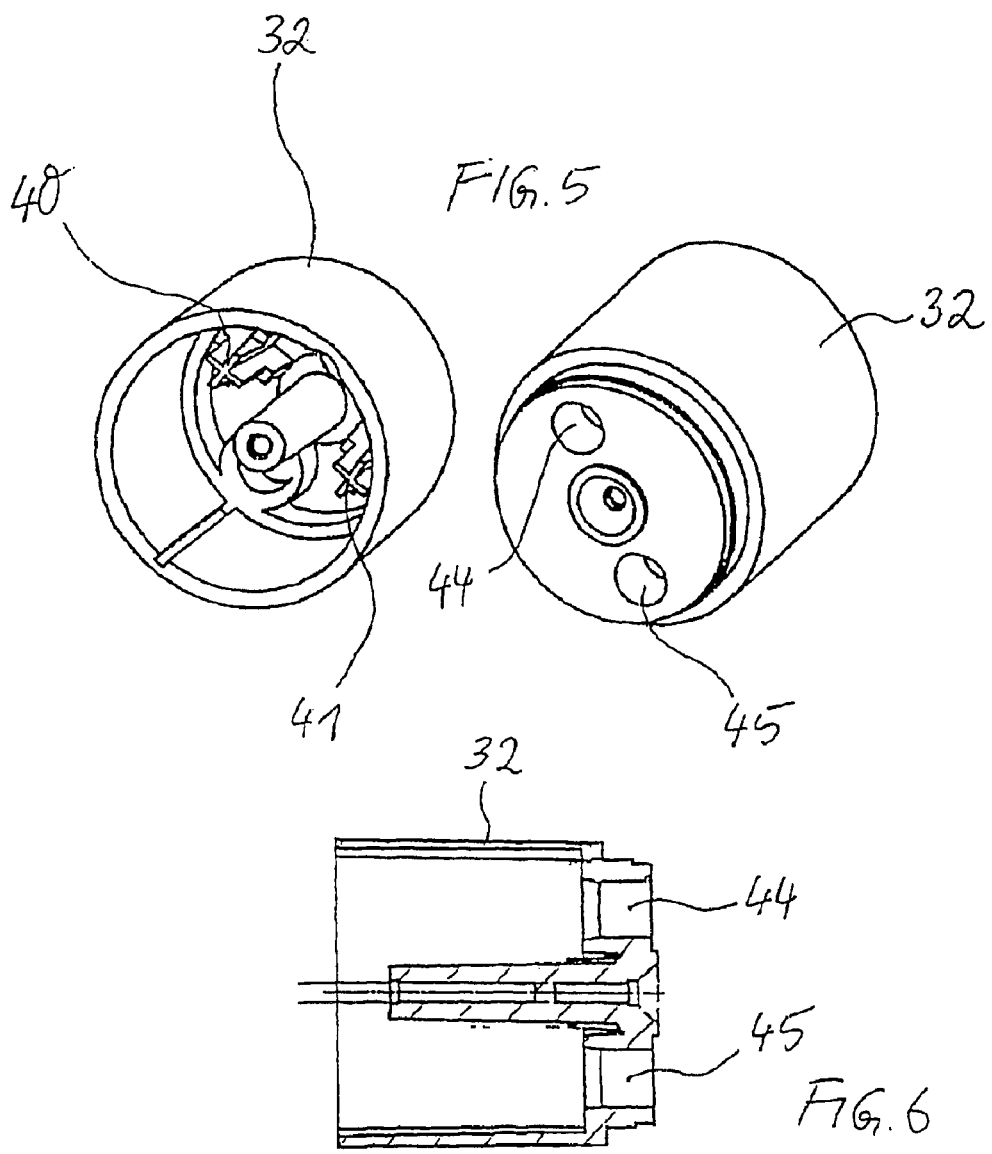
FIG. 5
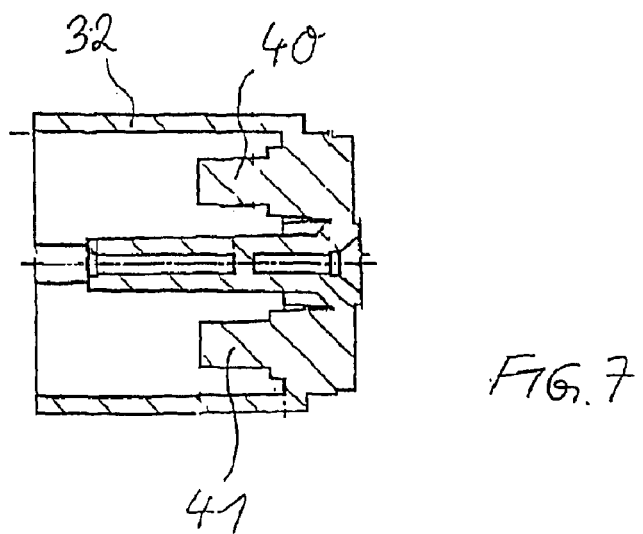
FIG. 6
FIG. 7

COFFEE MACHINE

TECHNICAL FIELD

The present invention relates to the field of automated coffee preparation. It concerns a coffee machine according to the preamble to claim 1.

A coffee machine of this type is known, for example, from the publication WO-A1-93/19655.

STATE OF THE ART

With automatic coffee preparation by means of coffee-making machines or coffee-vending machines, in which the coffee in bean form is first ground in a grinder housed in the machine, the ground coffee powder is then placed in a brewing chamber and compacted therein, pressurized hot water is then supplied through the brewing chamber and, finally, upon completion of the brewing process, the remaining filter cake is pushed out of the brewing chamber and ejected into a collecting container, it is desirable, in spite of the complex preparation steps to be performed, to arrange the machine in a manner such that it is of simple construction, operates for the longest possible periods of time without malfunction or maintenance, and is easy to clean and to maintain.

In the publication cited in the introduction, a coffee machine is now proposed, the central element of which is a removable brewing unit (1 in FIGS. 1–3). A base and a plunger are arranged so as to be displaceable along a main axis in this brewing unit and perform different movement sequences that are coordinated with one another. These travels are designed in a manner such that ground coffee powder placed in a filling chamber is transported into an adjacent brewing chamber and is compressed therein between the base and the plunger. Pressurized hot water is then passed through the cylindrical compressed powder in a radial direction. The brewed coffee produced is outlet from the brewing chamber radially and discharged downwards. Upon completion of the brewing process, the remaining filter cake is pushed out of the brewing chamber in an axial direction and is ejected transversely relative to the main axis by means of an ejector. The different travels of the base, of the plunger, and of the ejector are brought about by a common drive unit by means of a special mechanism which includes, amongst other things, two parallel racks engaged by a pinion. For a detailed explanation of the operation, reference should be made to the publication cited.

As can be seen from FIGS. 1 and 4 of the publication and from the description on page 4, last paragraph, the brewing unit is installed with its main axis, which corresponds to the direction of movement of the plunger, arranged transversely in the coffee machine, that is, the main axis extends parallel to the front of the machine. However, this arrangement has various disadvantages: owing to the displaceable arrangement of the base and of the plunger, as well as to the arrangement of the filling chamber, the brewing chamber, and the ejection region longitudinally relative to the main axis, the brewing unit reaches a relatively great length in the direction of the main axis, which length is effective as a width in the transverse installation described. Since, as well as the brewing unit, further functional units such as grinder, drive unit, water-heating unit, water reservoir, filter-cake collecting container, control electronics etc. are housed in the machine and must—at least partially—also be as accessible as possible from the front, the machine as a whole has a comparatively large width which is not always desirable.

Basically, it would be possible to design the transversely installed brewing unit so that it could be pushed in from the side. However, in practice, this would mean that sufficient space would always have to remain clear beside the machine to permit unobstructed insertion or removal of the brewing unit. It is therefore usual to insert the transversely installed brewing unit directly transversely from the front and to remove it towards the front. However, the space in front of the brewing unit in the machine must consequently be kept free over the entire width of the brewing unit.

A further problem arises in the coupling of the brewing unit, which has been removed and reinserted (for example, after cleaning), to the drive unit, which remains in the machine. In fact if, upon insertion, the movable elements (base, plunger, etc.) of the brewing unit adopt positions other than those adopted upon removal, the engagement point for the coupling is also displaced. An adjustment of the drive unit to the new engagement point, however, is difficult with the transverse installation of the brewing unit.

Disadvantages owing to the transverse installation also arise with regard to the water supply: in order to limit, as far as possible, cooling of the brewed coffee on the path from the brewing chamber to the outlet, this path must be kept as short as possible. However, this means a radial flow through the brewing chamber which results in comparatively high flow resistances.

STATEMENT OF THE INVENTION

The object of the invention is therefore to provide an automatically operating coffee machine which has a compact brewing unit and which overcomes the disadvantages of known coffee machines and is characterized in particular by a simplified and space-saving design as well as easier accessibility for cleaning and maintenance purposes.

The object is achieved by the features of claim 1, taken as a whole. The essence of the invention is to design the brewing unit so that it can be pushed into the coffee machine from the front towards the rear with the main axis parallel to the direction of insertion. The brewing unit thereby requires only a small width of the machine both inside the machine and also during installation and removal. Moreover, this longitudinal insertion permits the arrangement under the brewing unit of suitable collecting containers which extend along the entire length of the brewing unit and thus offer protection against leakages in the brewing unit.

A first preferred embodiment of the invention is characterized in that one or a plurality of guides, which extend parallel to the main axis of the brewing unit and are preferably bar-shaped, are provided for guiding the brewing unit during insertion in and removal from the coffee machine, and in that a catch is provided at the front end of the guide, for locking the inserted brewing unit. The guide facilitates the accurately positioned insertion of the brewing unit and thus ensures in a simple manner the mechanical and hydraulic connections between the brewing unit and the machine that are necessary for correct operation.

A second preferred embodiment of the coffee machine according to the invention is characterized in that, in the brewing unit, the pressurized hot water is forced through the coffee powder disposed in the brewing chamber in the direction of the main axis, forwards from the rear and leaves through an outlet which is arranged at the front end of the brewing unit and is preferably adjustable in height, and in that the movable base and the plunger are equipped, on their surfaces facing the brewing chamber, with respective mesh plates through which the hot water enters the brewing chamber and the brewed coffee leaves the brewing chamber, respectively. With the longitudinal configuration of the brewing unit according to the invention, with improved flow through the coffee powder, this enables advantageously short paths for the fluid to be achieved, which is of benefit to the quality of the brewed coffee.

Another preferred embodiment of the invention is characterized in that the movable base and the plunger are driven by means of an actuating slide which is arranged so as to be displaceable in the direction of the main axis in the brewing unit and which is releasably in engagement with a driving dog which is situated on a threaded rod arranged parallel to the main axis and which can be displaced along the main axis by rotation of the threaded rod, and in that releasable engagement between the driving dog and the actuating slide is brought about by a latching hook which extends in the direction of the main axis and is arranged so as to be pivotable on the driving dog about a pivot axis arranged transversely relative to the main axis. The engagement between the driven dog and the inserted brewing unit can be re-established easily and automatically thereby, even if the engagement position has changed in the meantime.

Particularly simple control of the compacting of the coffee powder can be achieved if, in addition, the threaded rod is mounted so as to be displaceable in the direction of the main axis against the pressure of a spring element, preferably a spring assembly, and if the displacement of the threaded rod against the pressure of the spring element or spring assembly, for a predetermined travel as established by the striking of the driving dog, of the actuating slide, or of the plunger, against a resistance, is used for the control or switching of the drive.

The change in density arising in the moistened coffee powder can be compensated for and an optimal brewing process can thereby be ensured if the plunger is moved by means of a plunger actuator displaceable in the direction of the main axis and if the plunger is operatively connected to the plunger actuator by means of compression springs acting in the direction of the main axis.

Preferably, the pressurized hot water is supplied into the brewing chamber through the plunger and a valve mechanism is arranged on the plunger, the valve mechanism being closed when the plunger presses on the coffee powder disposed in the brewing chamber with a predetermined pressure and relieving the pressure of the pressurized water and allowing the water to escape to the exterior when the pressure of the plunger on the coffee powder is removed. In particular, this is brought about by virtue of the fact that the valve mechanism includes valve push-rods which are arranged on the plunger actuator and which, upon sufficient compression of the compression springs, sealingly enter corresponding valve bores in the plunger, which valve bores are in communication with a hot-water supply duct. Preferably, the hot-water supply duct can extend directly through one of the valve push-rods and the valve bores can be in communication with the brewing chamber through a mesh plate.

BRIEF DESCRIPTION OF THE DRAWINGS

The invention will be described in greater detail below by means of embodiments, with reference to the drawings. In the drawings:

FIG. 5 is a perspective view of the plunger of FIG. 4, viewed from the rear and from the front, FIG. 6 is a longitudinal section through the plunger of FIG. 5 in a plane extending through the valve bores, and FIG. 7 is a longitudinal section through the plunger of FIG. 5 in a plane extending through the spring pins.

IMPLEMENTATION OF THE INVENTION

Figure 1:
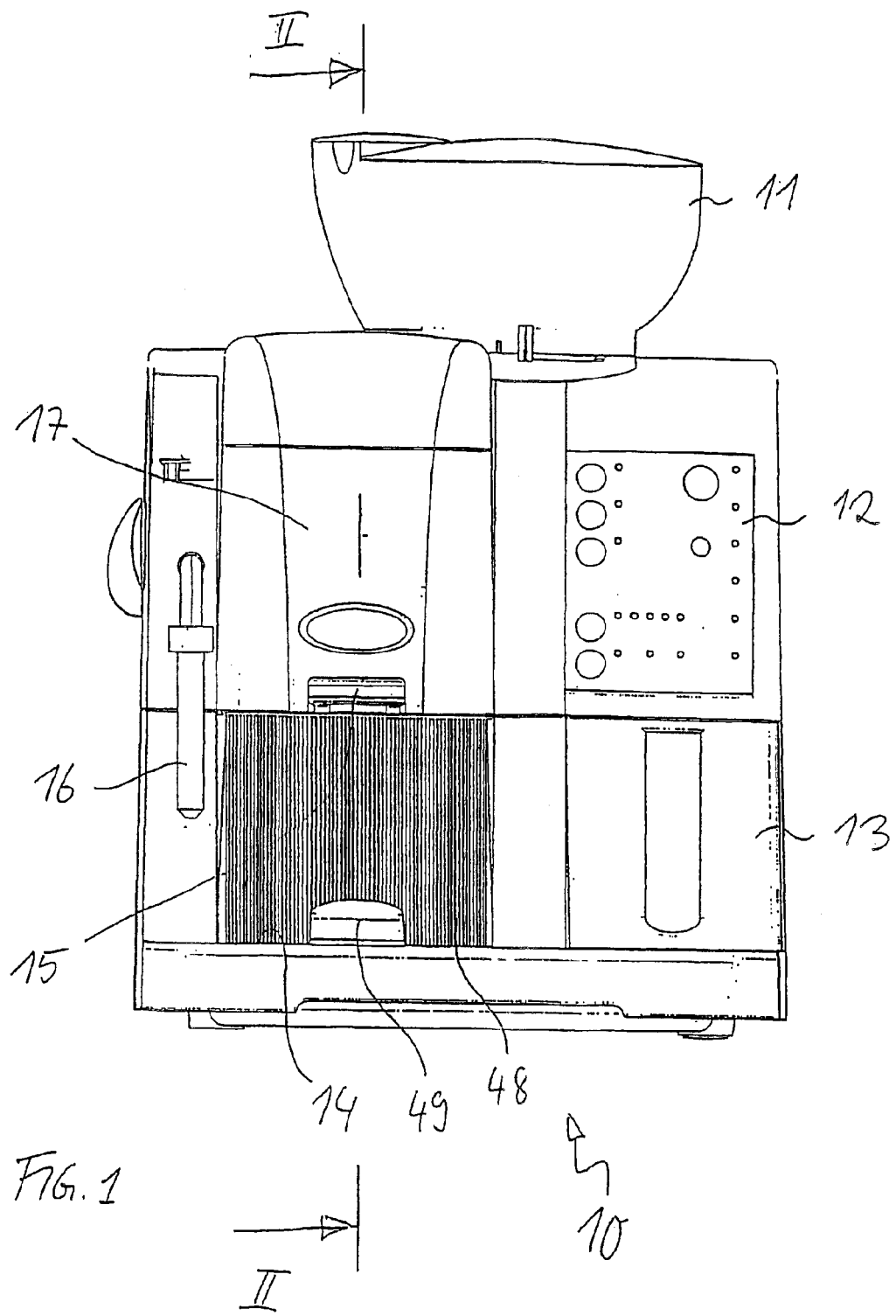
FIG. 1 is an overall view from the front of a coffee machine according to a preferred embodiment of the invention in the closed condition.
Figure 2:
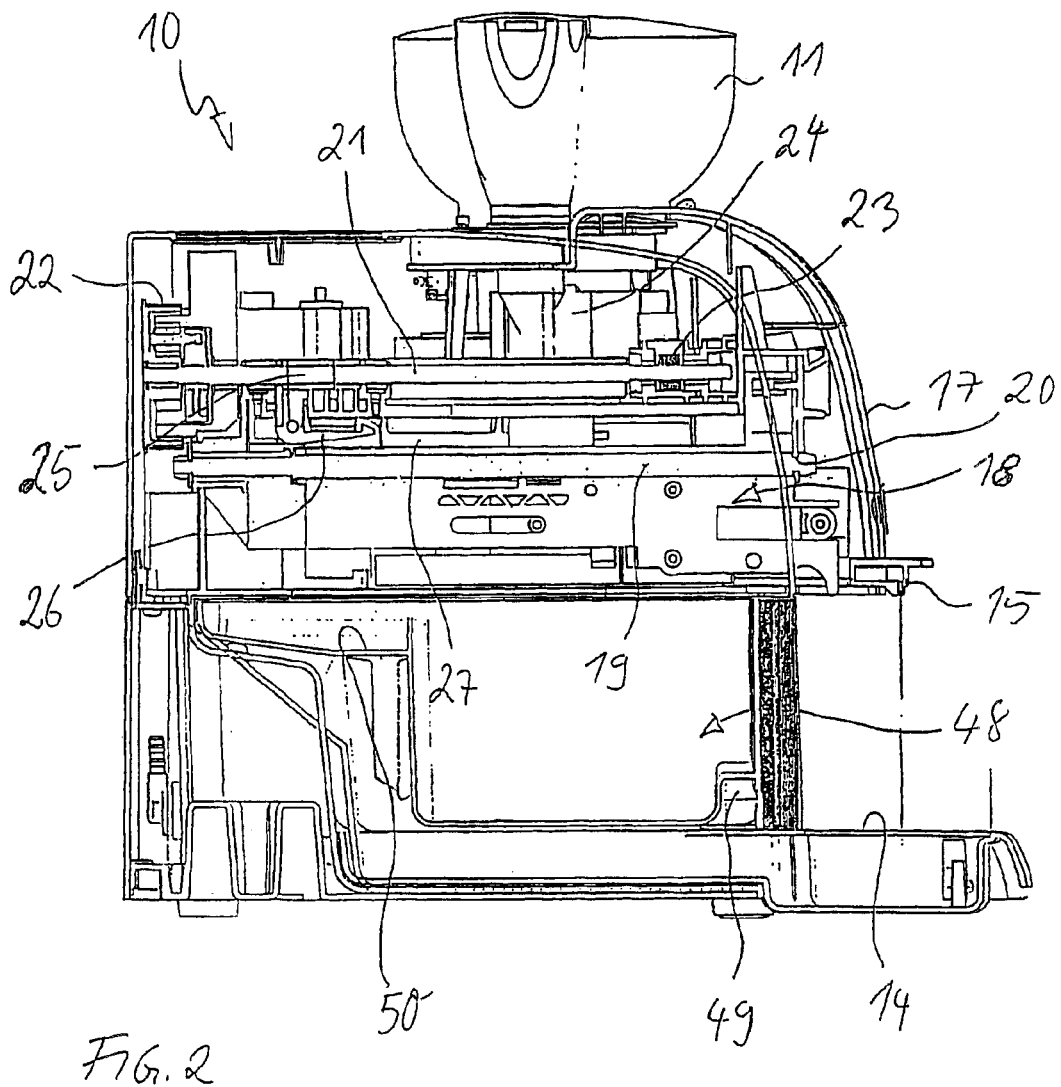
FIG. 2 is a cross-section through the machine of FIG. 1 in the plane II—II.

In FIG. 1, a coffee machine according to a preferred embodiment of the invention is shown in the closed condition, in an overall view from the front. FIG. 2 shows a cross-section through the machine of FIG. 1 in the plane II—II. The coffee machine 10 has, at the top, a loading hopper 11 for the coffee beans to be ground. An associated grinder 24 is arranged beneath the loading hopper 11. The coffee ground in the grinder 24 falls into a compact brewing unit 18 and is compacted therein in a brewing chamber (29 in FIGS. 3, 4). Pressurized hot water is then forced through the compressed powder. The resulting brewed coffee leaves the brewing chamber through a spring-loaded creaming valve and is drawn off through an outlet 15 which projects forwards out of the coffee machine 10 and is preferably adjustable in height (pivotable), for example, into a cup which stands on a support surface 14 arranged beneath the outlet 15. A steam/hot water nozzle 16 is arranged beside the outlet 15 for the foaming of milk (cappuccino) or for delivering hot water. The removable brewing unit 18 is covered at the front by a swivelling or removable cover 17. An operating console 12 with the necessary operation and control elements is provided for the operation of the machine. A water container 13 that can be pulled out towards the front is arranged beneath the operating console 12, for storing the water supply. A collecting container 48 for the filter cakes that are produced during the brewing process and are ejected from the brewing chamber is disposed on the left, beside the water container 13, directly beneath the brewing unit 18 situated behind the cover 17. The collecting container 48 can be pulled out towards the front by means of a gripping recess 49. The collecting container 48 extends, together with an extension 50 formed on the rear region, beneath the brewing unit 18 along the entire length of the brewing unit 18. If any leakages should occur in the brewing unit 18, the collecting container 48 can thus also collect dripping water or coffee slops which can then easily be removed by pulling out the collecting container 48 together with the collected filter cakes. Permanent soiling of the coffee machine 10 can thus safely be prevented.

Figure 3:
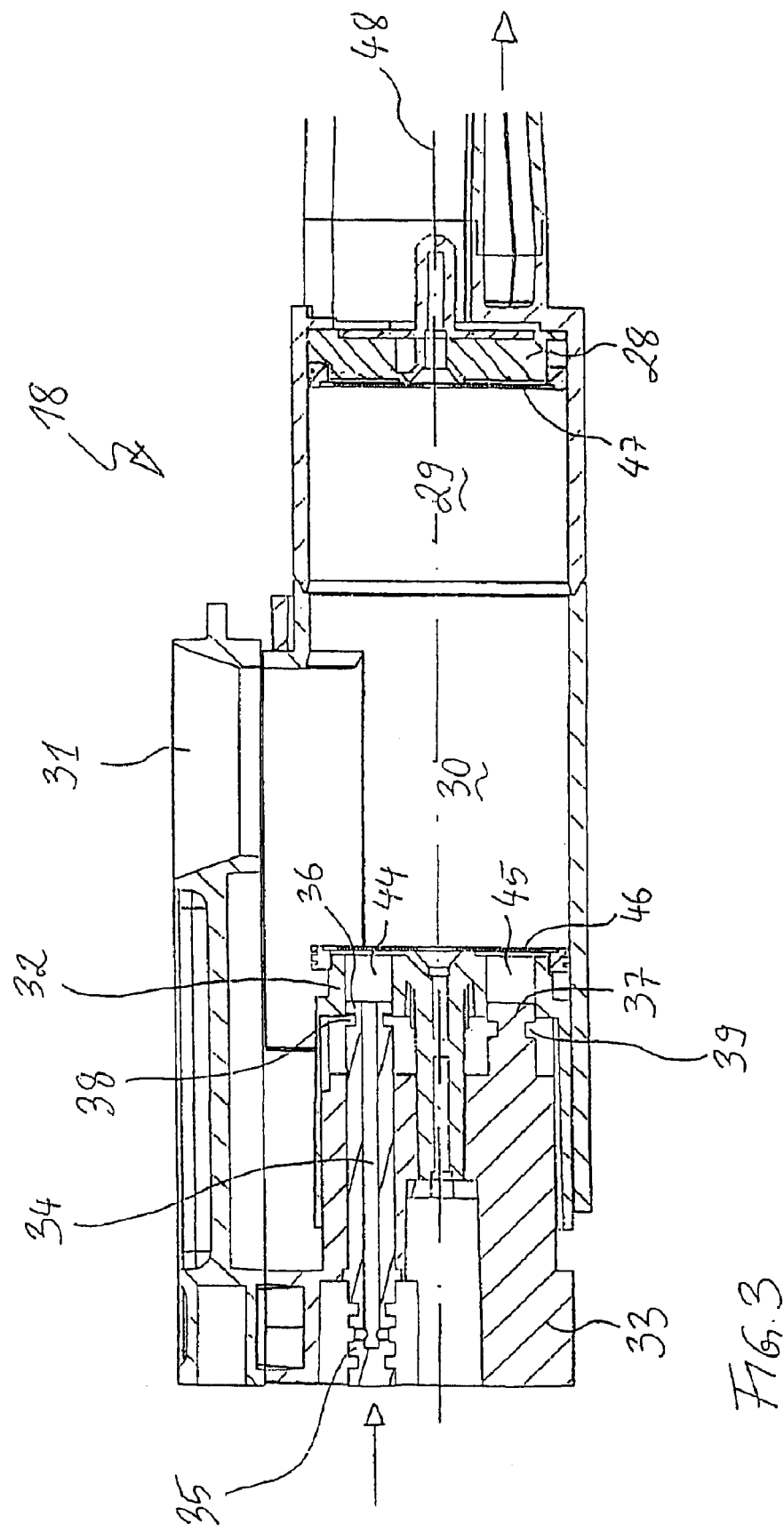
FIG. 3 is a vertical longitudinal section through the brewing unit of the machine of FIG. 2.
Figure 4:
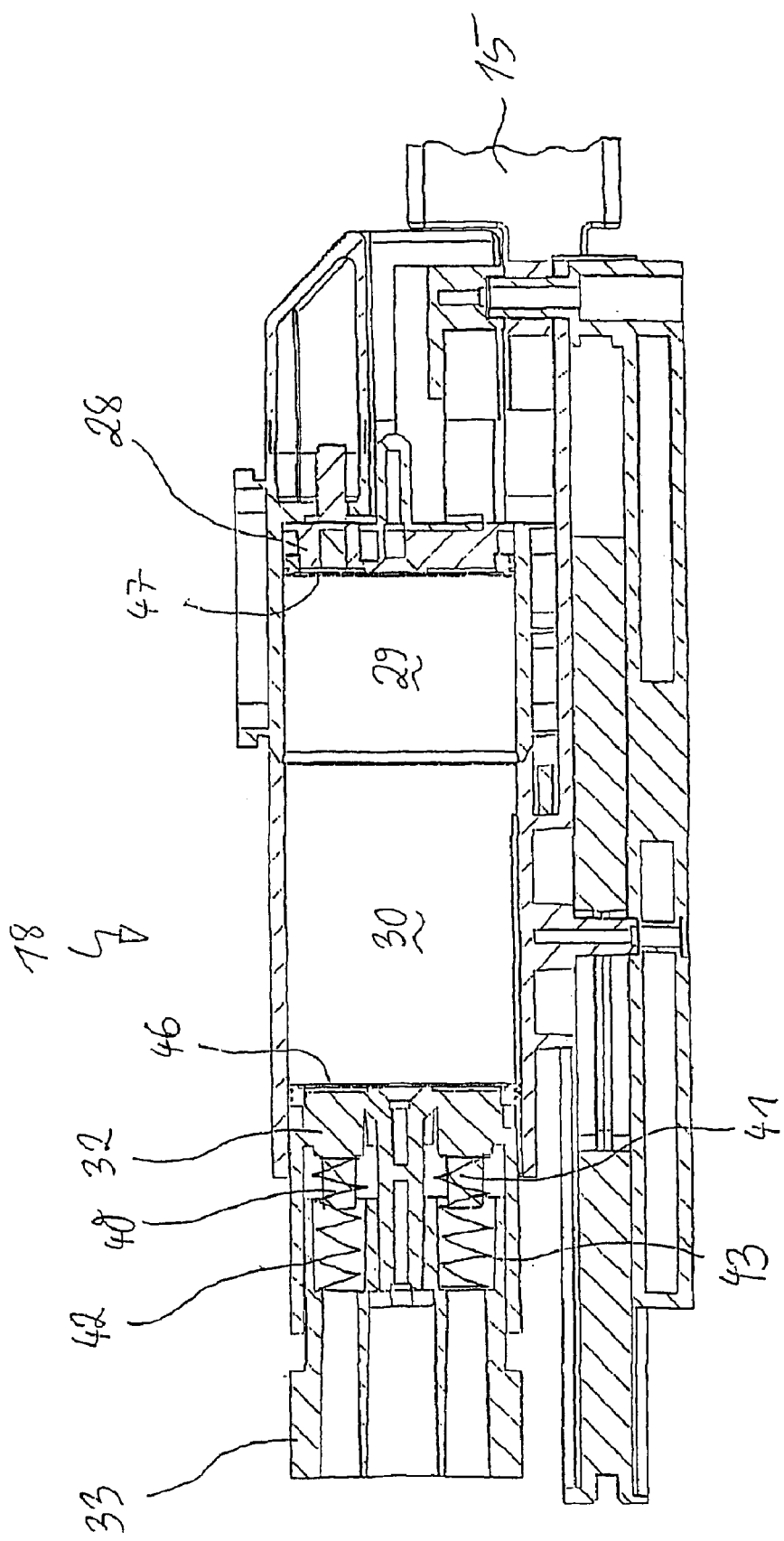
FIG. 4 is a horizontal longitudinal section through the brewing unit of the machine of FIG. 2.

The brewing unit 18 extends, according to FIGS. 3 and 4, along a main axis 48. It includes, in addition to a filling chamber 30 and a brewing chamber 29, a movable base 28 displaceable in the direction of the main axis 48 and a plunger 32, also displaceable in the direction of the main axis 48. As described in the publication cited in the introduction, the ground coffee powder falls out of the grinder 24 through a filling opening 31 into the filling chamber 30. By a displacement of the plunger 32 towards the right (FIG. 3), the loaded coffee powder is pushed from the filling chamber 30 into the brewing chamber 29 where it is pressed against the movable base 28 and thereby compacted. Respective mesh plates 46 and 49 are secured on the end surfaces of the plunger 32 and of the movable base 28 (FIG. 4). Hot water is supplied into the brewing chamber 29 through the mesh plate 46 from the Left, in an axial direction, through the plunger 32. The brewed coffee leaves the brewing chamber 29 through the mesh plate 47, axially towards the right, through the movable base 28, and reaches the directly adjacent outlet 15 (FIG. 4).

The brewing unit 18 is pushed into the coffee machine 10 in the longitudinal direction, that is, in the direction of the main axis 48, from the front towards the rear (FIG. 2). For guiding the brewing unit 18 during insertion, use is made of one or a plurality of bar-shaped guide(s) 19 on the front end of which a (releasable) catch 20 for the brewing unit 18 is also arranged. The movable base 28 and the plunger 32 are moved, for example, by a rack mechanism as described by way of example in WO-A1-93/19655, of an actuating slide 27 arranged so as to be displaceable in the brewing unit 18. The actuating slide 27 can be brought into engagement, by means of a releasable latching hook 26, with a driving dog 25 which is situated on a rotatable threaded rod 21 which is driven by means of a drive wheel 22 of a drive motor, not shown. When the brewing unit 18 is pushed into the coffee machine 10, the driving dog 25 moves towards the right, with the latching hook 26, until the latching hook 26 has entered the actuating slide 27 and engaged therein. The engagement between the driving dog 25 and the actuating slide 27 can thus always safely be established, irrespective of exactly where the actuating slide 27 is disposed in the brewing unit 18 during insertion.

The threaded rod 21 is arranged parallel to the guide 19 in the coffee machine 10, is displaceable axially against the pressure of a spring assembly 23 composed of disc springs, and operates a microswitch (not shown) when the driving dog 25 strikes a resistance. In particular if, owing to compaction of the coffee powder, an opposing force builds up on the plunger 32 and thereby also on the driving dog 25, the microswitch is operated when a predetermined value of that opposing force is exceeded. The compaction process can thus safely be controlled.

According to a preferred embodiment of the invention, the plunger 32 is not coupled rigidly to the drive members but is connected, by means of two compression springs 42, 43, to a separate plunger actuator 33 which is driven by the actuating slide 27. The compression springs 42, 43 are situated with one end on two spring pins 40, 41 (see also FIGS. 5 and 7) which are formed on the inner end surface of the plunger 32. This spring coupling has a particular advantage: when the (dry) coffee powder is compacted, the drive switches off when a predetermined pressure is reached and the plunger actuator 33 and the plunger 32 come to a halt, in the course of which, owing to the prevailing pressure, the compression springs 42, 43 are compressed to a predetermined extent. If the hot water is now forced through the brewing chamber 29, owing to the moistening of the coffee powder, the density in the powder increases and the pressure in the powder decreases. The energy stored in the compression springs 42, 43 then suffices to push the plunger 32 from behind and to compensate for the loss in volume so that the formation of undesired water channels past the coffee powder is safely prevented.

The coupling described between the plunger 32 and the plunger actuator 33 by means of the compression springs 42, 43 permits the simple construction of a valve mechanism which serves for the safe relief of the pressure from the pressurized water system upon completion of the brewing process. For this purpose, valve bores 44, 45 with parallel axes are provided in the plunger 32 (FIGS. 3, 5 and 6); corresponding valve push-rods 36, 37 arranged on the plunger actuator 33 (FIG. 3) enter the valve bores 44, 45 sealingly when the compression springs 42, 43 are sufficiently greatly compressed. Sealing takes place by means of O-rings (not shown) which are inserted in corresponding grooves 38, 39 on the valve push-rods 36, 37. One of the valve push-rods, that is the valve push-rod 36, also serves as an (axial) supply duct 34 for the hot water. Moreover, connection to the hot water system of the coffee machine 10 is established by means of a fluid-tight plug-type connection 35 which is operated upon the insertion of brewing unit 18 in the machine.

If, upon completion of a brewing process, the plunger actuator 33 with the plunger 32 is withdrawn, the compression springs 42, 43 are released and the valve push-rods 36, 37 move out of the valve bores 44, 45 so that residual pressurized hot water can come out of the supply duct 34, with pressure relief, into the space between the plunger actuator 33 and the plunger 32, from where it can be discharged to the exterior.

Legend 10 coffee machine
11 filling hopper
12 operating console
13 water container
14 support surface (coffee cup)
15 outlet
16 steam/hot water nozzle
17 cover
18 brewing unit (removable)
19 guide (bar-shaped)
20 catch
21 threaded rod
22 drive wheel
23 spring assembly
24 grinder
25 driving dog
26 latching hook
27 actuating slide
28 movable base
29 brewing chamber
30 filling chamber
31 filling opening
32 plunger
33 plunger actuator
34 supply duct
35 plug-type connection
36, 37 valve push-rod
38, 39 groove (for O-ring)
40, 41 spring pin
42, 43 compression spring
44, 45 valve bore
46, 47 mesh plate (perforated plate)
48 collecting container (filter cakes)
49 gripping recess (collecting container)
50 extension (collecting container)

What is claimed is:

1. Coffee machine (10) including a horizontally removable brewing unit (18) in which ground coffee powder is compacted along a main axis (48) of the brewing unit (18) between a movable base (28) and a plunger (32) that can be displaced towards the movable base (28) in a brewing chamber (29), pressurized hot water is forced through the compacted coffee powder, and the remaining filter cake is then pushed out of the brewing chamber (29) by displacement of the movable base (28) and of the plunger (32) together along the main axis (48), and is ejected transversely relative to the main axis (48), wherein the brewing unit (18) is adapted to be pushed into the coffee machine horizontally from the front towards the rear, with the main axis (48) parallel to the direction of insertion.

2. Coffee machine according to claim 1, wherein one or a plurality of guides (19) which extend parallel to the main axis (48) of the brewing unit and are bar-shaped are provided for guiding the brewing unit (18) during insertion in and removal from the coffee machine (10).

3. Coffee machine according to claim 2, wherein a catch (20) is provided at a front end of the guide (19) for locking the inserted brewing unit (18).

4. Coffee machine according to claim 1, wherein, in the brewing unit (18), the pressurized hot water is forced through the coffee powder disposed in the brewing chamber (29) in the direction of the main axis (48), forwards from the rear and leaves through an outlet (15) which is arranged at a front end of the brewing unit (18) and is adjustable in height.

5. Coffee machine according to claim 4, wherein the movable base (28) and the plunger (32) are equipped, on their surfaces facing the brewing chamber (29), with respective mesh plates (46, 47) through which the hot water enters the brewing chamber (29) and the brewed coffee leaves the brewing chamber (29), respectively.

6. Coffee machine according to claim 1, wherein the movable base (28) and the plunger (32) are driven by means of an actuating slide (27) which is arranged so as to be displaceable in the direction of the main axis (48) in the brewing unit (18) and which is releasably in engagement with a driving dog (25) which is situated on a threaded rod arranged parallel to the main axis (48) and which can be displaced along the main axis (48) by rotation of the threaded rod (21).

7. Coffee machine according to claim 6, wherein the releasable engagement between the driving dog (25) and the actuating slide (27) is brought about by means of a latching hook (26) which extends in the direction of the main axis (48) and is arranged so as to be pivotable on the driving dog (25) about a pivot axis arranged transversely relative to the main axis (48).

8. Coffee machine according to claim 6, wherein the threaded rod (21) is mounted so as to be displaceable in the direction of the main axis (48) against the pressure of a spring element, and the displacement of the threaded rod (21) against the pressure of the spring element for a predetermined travel, as established by the striking of the driving dog (25), of the actuating slide (27), or of the plunger (32), against a resistance, is used for the control or switching of the drive.

9. Coffee machine according to claim 1, wherein the plunger (32) is moved by means of a plunger actuator (33) displaceable in the direction of the main axis (48), and the plunger (32) is operatively connected to the plunger actuator (33) by means of compression springs (42, 43) acting in the direction of the main axis (48).

10. Coffee machine according to claim 9, wherein the pressurized hot water is supplied into the brewing chamber (29) through the plunger (32), and a valve mechanism (36, 37, 38, 39, 44, 45) is arranged on the plunger (32), the valve mechanism (36, 37, 38, 39, 44, 45) being closed when the plunger (32) presses on the coffee powder disposed in the brewing chamber with a predetermined pressure, and relieving the pressure of the pressurized water and allowing the water to escape to the exterior when the pressure of the plunger (32) on the coffee powder is removed.

11. Coffee machine according to claim 10, wherein the valve mechanism includes valve push-rods (36, 37) which are arranged on the plunger actuator (33) and which, upon sufficient compression of the compression springs (42, 43), sealingly enter corresponding valve bores (44, 45) in the plunger (32), which valve bores are in communication with a hot-water supply duct (34).

12. Coffee machine according to claim 11, wherein the hot-water supply duct (34) extends directly through one of the valve push-rods (36, 37), and the valve bores (44, 45) are in communication with the brewing chamber (29) through a mesh plate (46).

* * * * *